United States Patent
Takahashi

[19]

[11] Patent Number: 6,125,456
[45] Date of Patent: Sep. 26, 2000

[54] MICROCOMPUTER WITH SELF-DIAGNOSTIC UNIT

[75] Inventor: Nobushi Takahashi, Tokyo, Japan

[73] Assignee: NEC Corporation, Tokyo, Japan

[21] Appl. No.: 08/920,043

[22] Filed: Aug. 28, 1997

[30] Foreign Application Priority Data

Aug. 28, 1996 [JP] Japan .................................. 8-226581

[51] Int. Cl.$^7$ .................................................. G06F 11/26
[52] U.S. Cl. .............................. 714/25; 714/719; 710/260
[58] Field of Search .......................... 395/183.01, 183.1, 395/183.11, 733, 183.08, 183.18; 371/21.2; 714/25, 34, 27, 30, 31, 32, 35, 43, 719; 710/260, 261

[56] References Cited

U.S. PATENT DOCUMENTS

| | | | |
|---|---|---|---|
| 4,989,208 | 1/1991 | Akao et al. . | |
| 5,163,150 | 11/1992 | Matsushima et al. | 710/261 |
| 5,367,676 | 11/1994 | Katori | 710/261 |
| 5,475,852 | 12/1995 | Yoshida et al. | 714/34 |
| 5,557,558 | 9/1996 | Daito | 395/183.01 |
| 5,657,330 | 8/1997 | Matsumoto | 714/733 |
| 5,664,199 | 9/1997 | Kuwahara | 395/733 |
| 5,687,380 | 11/1997 | Sakuma | 710/261 |

FOREIGN PATENT DOCUMENTS

| | | |
|---|---|---|
| 0 018 736 A1 | 4/1980 | European Pat. Off. . |
| 0 556 826 A2 | 2/1993 | European Pat. Off. . |
| 56-96331 | 8/1981 | Japan . |
| 59-20069 | 2/1984 | Japan . |
| 60-183639 | 9/1985 | Japan . |
| 63-67647 | 3/1988 | Japan . |
| 4-10138 | 1/1992 | Japan . |
| 4-178742 | 6/1992 | Japan . |
| 6-162225 | 6/1994 | Japan . |

OTHER PUBLICATIONS

English Abstract for JP Application No. 4–10138.
English Abstract for JP Application No. 59–20069.
English Abstract for JP Application No. 63–67647.
English Abstract for JP Application No. 6–162225.

*Primary Examiner*—Robert W. Beausoliel, Jr.
*Assistant Examiner*—Christopher A. Revak
*Attorney, Agent, or Firm*—Hutchins, Wheeler & Dittmar

[57] ABSTRACT

To perform the self-diagnostic of the CPU, the CPU monitor macro service is activated in response to the interrupt signal from the external. In the CPU monitor macro service, according to the CPU monitor macro service code in the instruction code storage area, the initial value α for use in diagnosing the CPU which has been written in the RAM previous to the initiation of the CPU monitor macro service is stored in the TA register. Also, the address β denoting the output destination of the execution resultant value of diagnosing the CPU by using the initial value α is stored in the TC register. The initial value α is used for checking an address and a path related to the RAM, and for checking the register saving the data in interrupt processing. Subsequently, the arithmetic operation unit, ALU executes the operation on the execution resultant value to transfer operated execution resultant value to the ALU register. Thereafter, the execution resultant value is forwarded to the TA register, and is further to output to the output destination in the external memory designated by the address β stored in the TC register via the input/output port, the status of the microcomputer is checked at the external thereof.

20 Claims, 2 Drawing Sheets

MICROCOMPUTER WITH SELF-DIAGNOSTIC UNIT

BACKGROUND OF THE INVENTION

1. Field of the Invention

The present invention relates to a microcomputer having a self-diagnostic unit, and more specifically to a microcomputer with a self-diagnostic function of diagnosing the CPU in the microcomputer by the CPU monitor macro service which is a program for executing a series of instructions necessary for diagnosing the CPU by the external interrupt signal.

2. Description of the Related Art

Recently, to enhance the performance of the motor vehicle and increase the safety thereof, there has been commonly used an electronic controller provided with a microcomputer, in the main controller of the motor vehicle such as the engine controller and the brake controller. If a failure arises in the user set which involves the engine controller and the brake controller or in the microcomputer, it may endanger human life. Accordingly, the microcomputer for use in such a technical field requires a high reliability. To check whether or not a failure occurs in the microcomputer prior to shipping the user set, the engineer of the controller for the motor vehicle applies the self-diagnostic software to the microcomputer from the external, after installing it in the user board. Thus, the self-diagnostic software diagnoses the CPU in the microcomputer to confirm whether a failure occurs or not based upon the diagnostic result.

As described above, concerning the conventional microcomputer used in the motor vehicle, the self-diagnostic software diagnosing the CPU is applied to the microcomputer after installation of it in the user board to confirm the status of the microcomputer, previous to the shipment of the user set. In this case, the self-diagnostic of the CPU is implemented pursuant to the instructions of the CPU self-diagnostic software read in from the external. Therefore, the time for reading in the instructions of the CPU self-check software is necessary.

On the other hand, there has been published a macro service which executes a series of instructions by the interrupt, in the Japanese Patent Publication Laid-Open No. 60-183639 "data processing apparatus." In the conventional macro service, the central processing unit includes data processing control means, which performs the arithmetic operation and the forwarding on the data stored in the storage with the whole status unchanged, upon halting the first process relevant to executing the program in the program memory. In response to the request for processing from the counter, the data processing means carries out the arithmetic operation and the forwarding. Consequently, the conventional data processing apparatus reduces the time for the interrupt processing, thus returning to the first process quickly.

The purpose of the above conventional macro service, however, is only to decrease the time necessary to execute the external program as an interrupt processing, but not to reduce the time for diagnosing the CPU. As regards the CPU diagnostic, the above publication teaches neither any function nor any structure.

SUMMARY OF THE INVENTION

An object of the present invention is to provide a microcomputer with self-diagnostic unit which is capable of diagnosing the CPU in a shorter period of time by reducing the time for reading the instructions of the software, as compared with the conventional microcomputer diagnosing the CPU pursuant to an external software.

In accordance with the present invention, the microcomputer with self-diagnostic unit employs the CPU monitor macro service which executes a series of instructions by the interrupt, to perform the self-diagnostic on the CPU in the microcomputer after installation thereof onto the user board.

According to one aspect of the present invention, a microcomputer with self-diagnostic unit comprises: a CPU; a RAM which is arbitrarily read and written; an interrupt processing unit; a data bus; an input/output port; a CPU monitor macro service which is a program for executing a series of instructions to diagnose the CPU of the microcomputer by an external interrupt signal; a CPU diagnostic unit diagnosing the CPU of the microcomputer with reference to data which has been given from the external beforehand, according to the CPU monitor macro service; and output unit outputting a result of diagnosing by the CPU diagnostic unit using the data given by the external to the external of the microcomputer.

According to another aspect of the present invention, a micro computer with self-diagnostic unit comprises: a CPU; a RAM which is arbitrary read and written; an interrupt processing unit; a data bus; an input/output port; a CPU monitor macro service which is a program for executing a series of instructions to diagnose the CPU of the microcomputer by an external interrupt signal; activating unit for activating the CPU monitor macro service; a micro ROM which is an instruction code storage area storing instruction codes of the CPU macro monitor service; a first register which stores an initial value for executing diagnosis of the CPU written in the RAM using a user program in an external memory prior to the initiation of the CPU monitor macro service, according to the instruction codes of the CPU monitor macro service in the micro ROM; a second register which stores an address designated an output destination for an execution resultant value after executing the diagnosis of CPU using the initial value written in the RAM using a user program in the external memory as above; a third register which checks addresses of the RAM and paths thereto using the initial value to save data in interrupt processing; a designation unit which designates the third register; a fourth register which stores a result of the arithmetic operation by an operation unit which implements arithmetic operations on the execution resultant value of the checking; and an output unit which stores the result from the fourth register to the first register after the checking and outputs the execution result value stored in the first register to the external of the microcomputer via a port designated by the second register, wherein the status of the CPU of the microcomputer is diagnosed with reference to the execution resultant value at the external of the microcomputer.

DESCRIPTION OF THE PREFERRED EMBODIMENTS

Hereinafter, the embodiment of the microcomputer with a self-diagnostic unit according to the present invention will be now described with reference to the accompanying drawings.

Figure 1:
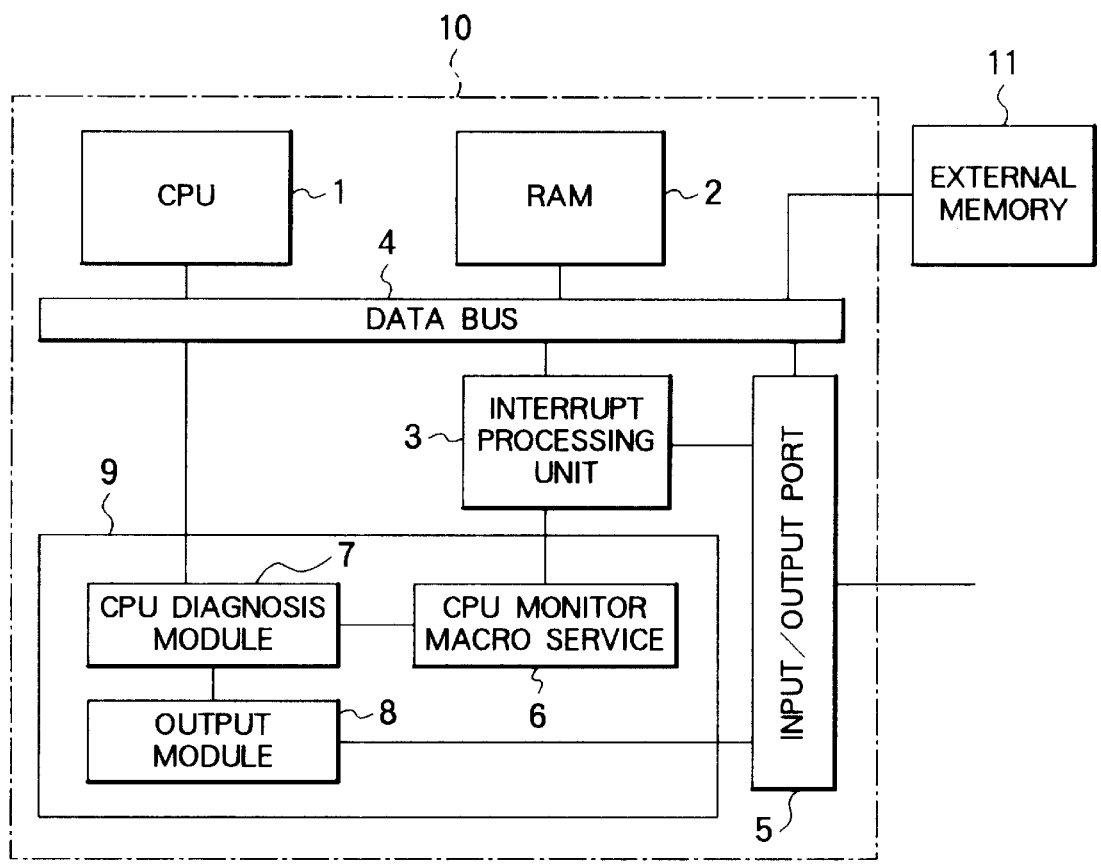
FIG. 1 is a block diagram showing the structure of the embodiment of the microcomputer with self-diagnostic unit according to the present invention.
Figure 2:
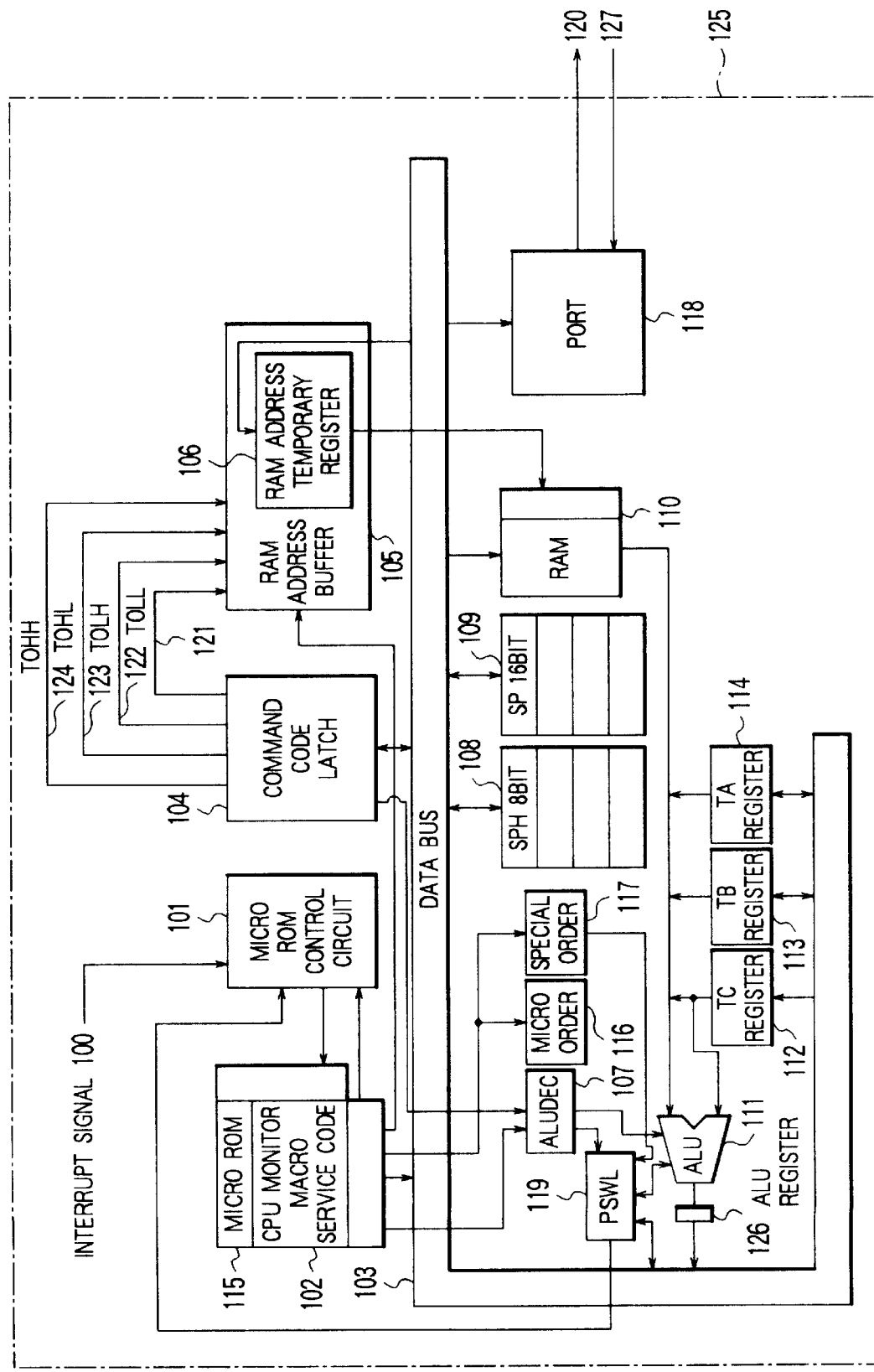
FIG. 2 is a block diagram showing the detailed structure of the embodiment of the microcomputer with self-diagnostic unit according to the present invention.

FIG. 1 is a block diagram showing the structure of the embodiment of the microcomputer with self-diagnostic unit according to the present invention and FIG. 2 is a block diagram showing the detailed structure of the embodiment.

First, the structure of the embodiment will be described with reference to FIG. 1.

As shown in FIG. 1, the microcomputer 10 according to this invention comprises a CPU 1, a RAM 2 which is arbitrarily readable and writable, an interrupt processing unit 3, a data bus 4, an input/output port 5, and a self-diagnostic unit 9. The self-diagnostic unit 9 includes a CPU monitor macro service 6, a CPU diagnosis module 7, and an output module 8. The CPU monitor macro service 6 is a program which executes a series of instructions to diagnose the CPU 1 in response to the external interrupt signal. The CPU diagnosis module 7 diagnoses the CPU 1 by referring to the data in an external memory 11 in accordance with the CPU monitor macro service 6. The output module 8 outputs the diagnostic result of the CPU 1 to the external using the reference data.

Next, the detailed structure of the embodiment of the microcomputer with a self-diagnostic unit according to the present invention will be explained referring to FIG. 2.

In response to an interrupt signal 100 requesting the diagnostic of the CPU, a micro ROM control circuit 101 activates the CPU monitor macro service which executes a series of the instructions necessary for diagnosing the CPU. Then, the micro ROM control circuit 101, which produces addresses of instruction code storage areas corresponding instructions and interrupt signals, designates a CPU monitor macro service code 102 in a micro ROM 115 which is the instruction code storage area. According to the CPU monitor macro service code 102, an initial value α which is used for diagnosing the CPU and an address are stored in a TA register 114 and a TC register 112, respectively. The initial value α is written in a RAM 110 by the user program in the external memory 11 via the line of an external signal 127 prior to the activation of the CPU monitor macro service. And the address denotes the output destination for the execution resultant value of diagnosing the CPU using the initial value α. The initial value α in the TA register 114 is utilized to sequentially check addresses of the RAM 110 and functions of a TB register 113 which saves the data in the interrupt processing. After the check, an ALU 111, which is an arithmetic operation unit, performs the operation on the execution resultant value to forward the operated execution resultant value to an ALU register 126, whereby it is stored in the TA register 114. Thereafter, the execution resultant value in the TA register 114 is output as an internal signal 120 of a microcomputer 125 via a port 118 designated by the above address in the TC register 112, whereby the user confirms whether a failure occurs or not referring to the execution resultant value.

A micro order 116 designates a block where a data should be output to the data buss 103. A PSWL 119 is a low-order 8 bit of program status word. A special order 117 performs a set and reset of a flag of the PSWL 119. A SPH 108 is a stack pointer high-order 8-bit which is constituted of high-order four bits of the above register for saving. A SP 109 is a stack pointer low-order 16 bit which is the stack pointer incorporating low-order 16 bits of the register saving the data in the interrupt processing.

Next, the operation of the above embodiment will be described.

The interrupt signal 100 activates the CPU monitor macro service for executing a series of instructions in response to the interrupt signal. The CPU monitor macro service respectively writes in the TA register 114 and in the TC register 112, the initial value α for use in diagnosing the CPU and the output destination address β of the execution resultant value of diagnosing the CPU (hereinafter, abbreviated as SFR output destination address), both of which have been written in the RAM 110 via the line of the external signal 127 using the user program in the external memory 11 prior to the initiation of the CPU monitor macro service.

First, the address designated by the RAMAD 105(RAM address buffer) preparing addresses in the RAM 110 is confirmed. The value Va in a register of the RAM 110, which has been laid therein prior to the starting of the CPU monitor macro service, is saved into the TB register 113. The initial value α is forwarded from the TA register 114 to the register of RAM 110 designated by the RAMAD 105. After that, the RAMAD 105 designates the register of the RAM 110 which stores the initial value α. The register of the RAM 110 transfers the initial value α to the ALU 111, and simultaneously the CPU monitor macro service code 102 activates the ALU 111 through the ALUDEC 107 which specifies operations thereof. The ALU 111 executes the decrement specified by the ALUDEC 107, thus moving the execution resultant value (α−1) to the TA register 114. Then, the value Va saved in the TB register 113 returns to the register of the RAM 110. In this way, checking the RAM 110 is completed.

Next, the SP 109(stack pointer low-order 16 bit) is checked, which is the stack pointer incorporating low-order 16 bits of the register saving the data in the interrupt processing. The value Vb in the SP 109 is saved in the TB register 113. Also, the execution resultant value (α−1) in the TA register 114 is forwarded to the SP 109, and is further forwarded therefrom to the ALU 111. Simultaneously, the CPU monitor macro service code 102 specifies the operation of the ALU 111 through the ALUDEC 107. Thereby, the ALU 111 carries out the decrement specified by the ALU-DEC 107, thus transferring the execution resultant value (α−2) to the TA register 114. The value Vb saved in the TB register 113 returns to the SP 109. In this way, checking the SP 109 is completed.

Further, the operations of increment and decrement in the SPH 108(stack pointer high-order 8-bit), which is constituted of high-order four bits of the above register for saving, are checked. First, the value Vc in the SPH 108 is saved in the TB register 113, and the value (α−2) in the TA register 114 is forwarded to the SPH 108. Then, the CPU monitor macro service code 102 transfers the data "FFFF(H)" to the ALU 111 via the TA register 114, and also specifies the operation of the ALU 111 through the ALUDEC 107. Thus, the ALU 111 implements the increment specified by the ALUDEC 107. The increment allows the carry flag in the ALU register 126 to be "1", which permits the value (α−2) in the SPH 108 to experience the decrement to reduce to (α−3). The value (α−3) in the SPH 108 is moved to the TA register 114. The value Vc saved in the TB register 113 returns to the SPH 108. In this way, checking SPH 108 is completed.

Moreover, the path from a TQ 104(command code latch), which is the instruction code latch fetching instruction codes, to the address in the RAM 110 designated by the RAMAD 105, is checked. By accessing the TQ 104, the CPU monitor macro service code 102 transfers the data Vd at the address "0080(H)" in the RAM 110 designated by the TRA 106(RAM address temporary register), which is the register saving addresses relevant to the RAM 110, to the TB register 113 The value (α−3) in the TA register 114 is forwarded to the address AA in the RAM 110 designated by the TRA 106, and is further forwarded therefrom to the ALU 111. Also, the CPU monitor macro service code 102 specifies the operation of the ALU 111 through the ALUDEC 107, whereby the ALU 111 executes the decrement specified by the ALUDEC 107 to move the execution resultant value (α−4) to the TA register 114. Then, the value Vd saved in the TB register 113 returns to the address "0080(H)" in the RAM 110 designated by the TRA 106. In this way, checking the path related to the RAM 110 is completed.

Furthermore, the CPU monitor macro service code 102 transfers the address "0000(H)" to the TQ 104 to check TQLL 121, which are constituted of the least significant four bits of the TQ 104. The data Ve at the address AB in the RAM 110 designated by the TQLL 121 is saved in the TB register 113 via the ALU 111. The value (α−4) in the TA register 114 is forwarded to the address AB in the RAM 110 designated by the RAMAD 105, and is further forwarded to the ALU 111. Thereafter, The CPU monitor macro service code 102 specifies the operation of the ALU 111 through the ALUDEC 107, whereby the ALU 111 executes the decrement specified by the ALUDEC 107 to forward the execution resultant value (α−5) to the TA register 114. Then, the data Ve saved in the TB register 113 returns to the address AB in the RAM 110 designated by the TQLL 121. In this way, checking the TQLL 121 is completed.

Subsequently, the path to the address in the RAM 110 designated by the TQHH 124, which is the most significant four bits of the TQ 104, is checked. The data Vf at the address AC in the RAM 110 designated by the TQHH 124 is saved in the TB register 113. The value (α−5) in the TA register 114 is forwarded to the address AC in the RAM 110 designated by the TQHH 124, and is further forwarded to the ALU 111. The CPU monitor macro service code 102 specifies the operation of the ALU 111 through the ALUDEC 107, whereby the ALU 111 implements the decrement specified by the ALUDEC 107 to transfer the execution resultant value (α−6) to the TA register 114. The data Vf saved in the TB register 113 returns to the address AC in the RAM 110 designated by the TQHH 124.

After the check of the peripheral functions, SFR output destination address β in the TC register 112 is forwarded to the TB register 113 while the value (α−6) in the TA register 114 is forwarded to the TC register 112. The CPU monitor macro service code 102 specifies the operation of the ALU 111 through the ALUDEC 107, whereby the ALU 111 executes the comparison between the value (α−6) in the TA register 114 and the value (α−6) in the TC register 112. If coincident, the value (α−6) in the TA register 114 is forwarded to the ALU 111, wherein the ALU 111 executes the decrement specified by the CPU monitor macro service code 102 through the ALUDEC 107 to transfer the execution resultant value (α−7) to the TA register 114.

Pursuant to the designation by the CPU monitor macro service code 102 through the ALUDEC 107, the ALU 111 compares the value (α−7) stored in the TA register 114 and the value β, or SFR output destination address β stored in the TC register 112. If different, the value (α−7) in the TA register 114 is output to the ALU 111, whereby the ALU 111 performs the decrement specified by the ALUDEC 107 on the value (α−7) to transfer the execution resultant value (α−8), which represents the result of diagnosing the CPU, to the TA register 114.

Finally, the value (α−8) of the TA register 114 storing execution resultant data of CPU diagnosis is output to external 120 of the micro computer 125 according to the SFR output address stored in the TB register 113. Thus, the user can externally check the status of the CPU referring to the value (α−8).

As described above, the CPU is diagnosed by the CPU monitor macro service which executes a series of instructions using internal interrupts. This reduces the time for reading the instructions, as compared with the conventional method of reading from external by a program for use in self-diagnosing the CPU. Thereby, the CPU in the microcomputer, even if set on the user board, can be rapidly diagnosed.

What is claimed is:

1. A microcomputer with self-diagnostic unit comprising:

a CPU;

a RAM which is arbitrarily read and written;

an interrupt processing unit;

a data bus;

an input/output port;

a CPU monitor macro service which is a program for executing a series of instructions to diagnose the CPU of the microcomputer by an external interrupt signal;

a CPU diagnostic unit diagnosing the CPU of said microcomputer with reference to data which has been given from the external beforehand, according to said CPU monitor macro service; and output unit outputting a result of diagnosing by said CPU diagnostic unit using the data given by said external to the external of said microcomputer.

2. A micro computer with self-diagnostic unit comprising:

a CPU;

a RAM which is arbitrary read and written;

a interrupt processing unit;

an data bus;

an input/output port;

a CPU monitor macro service which is a program for executing a series of instructions to diagnose the CPU of the microcomputer by an external interrupt signal;

activating unit for activating said CPU monitor macro service;

a micro ROM which is an instruction code storage area storing instruction codes of said CPU macro monitor service;

a first register which stores an initial value for executing diagnosis of said CPU written in the RAM using a user program in an external memory prior to the initiation of said CPU monitor macro service, according to the instruction codes of the CPU monitor macro service in said micro ROM;

a second register which stores an address designated an output destination for an execution resultant value after executing the diagnosis of CPU using said initial value written in the RAM using a user program in the external memory as above;

a third register which checks addresses of the RAM and paths thereto using the initial value to save data in interrupt processing;

a designation unit which designates said third register;

a fourth register which stores a result of the arithmetic operation by an operation unit which implements arithmetic operations on the execution resultant value of said checking; and an output unit which stores the result from the fourth register to the first register after said checking and outputs the execution result value stored in said first register to the external of the microcomputer via a port designated by said second register, wherein the status of the CPU of said microcomputer is diagnosed with reference to the execution resultant value at the external of said microcomputer.

3. A self-diagnostic unit for a microcomputer, comprising:
   (a) a port coupled to memory that is read from and written to by a user program on the microcomputer; and
   (b) a micro ROM control circuit, responsive to CPU monitor macro service code stored in a micro ROM which executes in response to an interrupt signal, said micro ROM control circuit causing an initial value that is received from memory through the port to be used to selectively test storage locations by reading and writing the initial value and subsequent values derived therefrom to the storage locations, wherein a resultant value is provided by the port to the memory upon completion of testing.

4. A self-diagnostic unit for a microcomputer, according to claim 3, wherein the micro ROM control circuit selectively tests the storage locations in response to an interrupt signal.

5. A self-diagnostic unit for a microcomputer, comprising:
   (a) a port coupled to memory that is read from and written to by a user program on the microcomputer; and
   (b) a micro ROM control circuit, responsive to CPU monitor macro service code stored in a micro ROM which executes in response to an interrupt signal, said micro ROM control circuit causing an initial value that is received from memory through the port to be used to selectively test storage locations by reading and writing the initial value and subsequent values derived therefrom to the storage locations, wherein a resultant value is provided by the port to the memory upon completion of testing, wherein a CPU for the microcomputer operates substantially independently from the micro ROM control circuit.

6. A self-diagnostic unit for a microcomputer, comprising:
   (a) a port coupled to memory that is read from and written to by a user program on the microcomputer; and
   (b) a micro ROM control circuit, responsive to CPU monitor macro service code stored in a micro ROM which executes in response to an interrupt signal, said micro ROM control circuit causing an initial value that is received from memory through the port to be used to selectively test storage locations by reading and writing the initial value and subsequent values derived therefrom to the storage locations, wherein a resultant value is provided by the port to the memory upon completion of testing, wherein testing includes using the storage locations to decrement the initial value and subsequent values derived therefrom to provide the resultant value.

7. A self-diagnostic unit for a microcomputer, according to claim 6, wherein prior to testing a particular storage location, a value from the particular storage location is saved as a temporary value in a temporary location.

8. A self-diagnostic unit for a microcomputer, according to claim 7, wherein subsequent to testing the particular storage location, the temporary value is written to the particular storage location.

9. A self-diagnostic unit for a microcomputer, comprising:
   (a) communication means for receiving and sending data from and to a memory that is accessed by a user program on the microcomputer; and
   (b) testing means, coupled to the communication means, for selectively testing portions of the microcomputer in response to an interrupt signal using an initial value obtained from the memory via the communication means and for providing a resultant value.

10. A self-diagnostic unit for a microcomputer, according to claim 9, wherein the testing means selectively tests storage locations in response to an interrupt signal.

11. A self-diagnostic unit for a microcomputer, comprising:
   (a) communication means for receiving and sending data from and to a memory that is accessed by a user program on the microcomputer; and
   (b) testing means, coupled to the communication means, for selectively testing portions of the microcomputer in response to an interrupt signal using an initial value obtained from the memory via the communication means and for providing a resultant value to the memory, wherein a CPU for the microcomputer operates substantially independently from the testing means.

12. A self-diagnostic unit for a microcomputer, comprising:
   (a) communication means for receiving and sending data from and to a memory that is accessed by a user program on the microcomputer; and
   (b) testing means, coupled to the communication means, for selectively testing portions of the microcomputer in response to an interrupt signal using an initial value obtained from the memory via the communication means and for providing a resultant value to the memory, wherein said testing means includes decrementing means for decrementing the initial value and subsequent values within the portions of the microcomputer being tested in order to provide the resultant value.

13. A self-diagnostic unit for a microcomputer, according to claim 12, further comprising:
   (c) saving means for saving values from each of the portions of the microcomputer as temporary values prior to performing tests on each of the portions.

14. A self-diagnostic unit for a microcomputer, according to claim 13, further comprising:
   (d) restoring means for restoring the temporary values to the portions of the microcomputer subsequent to testing the portions.

15. A method of performing self-diagnosis for a microcomputer, comprising:
   (a) receiving an initial value from a memory that is accessed by a user program on the microcomputer;
   (b) testing portions of the microcomputer in response to an interrupt signal using the initial value; and
   (c) providing a resultant value to the memory, wherein the resultant value corresponds to the initial value and subsequent values derived therefrom in the course of testing.

16. A method of performing self-diagnosis for a microcomputer, comprising:
   (a) receiving an initial value from a memory that is accessed by a user program on the microcomputer;
   (b) testing portions of the microcomputer in response to an interrupt signal using the initial value; and
   (c) providing a resultant value to the memory, wherein the resultant value corresponds to the initial value and subsequent values derived therefrom in the course of testing, wherein a CPU for the microcomputer executes user program steps substantially independently of performing self-diagnosis.

17. A method of performing self-diagnosis for a microcomputer, comprising:
- (a) receiving an initial value from a memory that is accessed by a user program on the microcomputer;
- (b) testing portions of the microcomputer in response to an interrupt signal using the initial value; and
- (c) providing a resultant value to the memory, wherein the resultant value corresponds to the initial value and subsequent values derived therefrom in the course of testing, wherein testing includes selectively testing the portions in response to an interrupt signal.

18. A method of performing self-diagnosis for a microcomputer, comprising:
- (a) receiving an initial value from a memory that is accessed by a user program on the microcomputer;
- (b) testing portions of the microcomputer in response to an interrupt signal using the initial value; and
- (c) providing a resultant value to the memory, wherein the resultant value corresponds to the initial value and subsequent values derived therefrom in the course of testing, wherein testing includes decrementing the initial value and subsequent values derived therefrom to provide the resultant value.

19. A method according to claim 18, further comprising:
- (d) prior to testing a particular portion of the microcomputer, saving a value corresponding to the particular portion of the microcomputer as a temporary value in a temporary location.

20. A method according to claim 19, further comprising:
- (e) following testing the particular portion of the microcomputer, restoring the temporary value to the particular portion of the microcomputer being tested.

\* \* \* \* \*